United States Patent

Wulff

[11] 4,324,412
[45] Apr. 13, 1982

[54] COMPOSITE SHIELD-STEP
[75] Inventor: Bernard J. Wulff, Aurora, Ill.
[73] Assignee: Caterpillar Tractor Co., Peoria, Ill.
[21] Appl. No.: 132,757
[22] Filed: Mar. 24, 1980

Related U.S. Application Data

[63] Continuation-in-part of Ser. No. 21,370, Mar. 19, 1979, abandoned.

[51] Int. Cl.³ .............................................. B60R 3/00
[52] U.S. Cl. ...................................... 280/163; 182/90
[58] Field of Search .............. 280/163, 164 R, 164 A, 280/166, 169, 400, 426, 442; 296/62; 182/90; 180/136, 139, 235

[56] References Cited

U.S. PATENT DOCUMENTS

| | | | |
|---|---|---|---|
| 919,278 | 4/1909 | Yeager, Jr. | 182/90 |
| 1,378,713 | 5/1921 | Nami | 182/90 X |
| 1,415,699 | 5/1922 | Porter | 182/90 |
| 3,171,671 | 3/1965 | Cornett | 280/163 |
| 3,191,709 | 6/1965 | Symons | 280/163 X |
| 3,240,284 | 3/1966 | Finneman | 180/136 X |
| 4,121,691 | 10/1978 | Poplawski | 280/163 X |

Primary Examiner—Joseph F. Peters, Jr.
Assistant Examiner—Michael Mar
Attorney, Agent, or Firm—Ralph E. Walters

[57] ABSTRACT

A composite shield-step (10) is provided for an articulated log skidder of the type which has fluid lines (13) exposed through steering cylinder openings (20) to damage from logs and limbs in a logging environment. The composite shield-step (10) provides a first member (12) which is connected to the log skidder about the cylinder opening (20). The first member (12) has an opening (15) which is vertically offset from the cylinder opening (20) so that the fluid lines (13) are visible through both openings (15,20) but, being offset, logs and limbs do not have direct access to the fluid lines (13). A step (23) is formed on the first member (12) for easy access to the log skidder for operation.

7 Claims, 3 Drawing Figures

U.S. Patent    Apr. 13, 1982    4,324,412
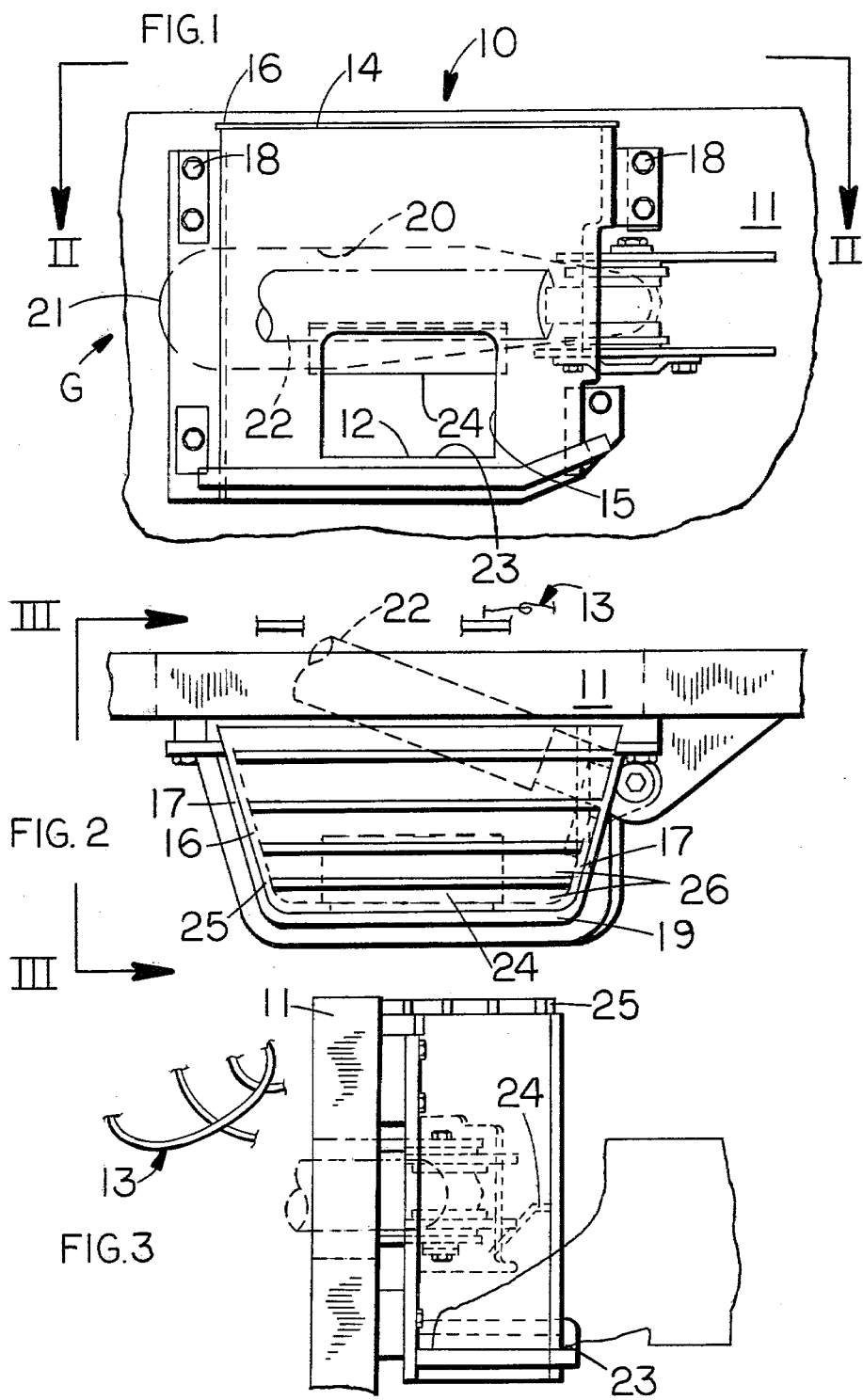

COMPOSITE SHIELD-STEP

BACKGROUND OF THE INVENTION

This application is a continuation-in-part of application Ser. No. 21,370 filed Mar. 19, 1979, now abandoned.

This invention pertains to a combination shield and step which has an inspection port for viewing apparatus protected by the shield.

Work vehicles, such as log handling vehicles, commonly called log skidders, often require one or more steps affixed to the vehicle to facilitate mounting and dismounting the vehicle. In articulated log skidders, the two sections of the vehicle pivot relative to each other about a central pivot point which complicates the placement of the steps. In articulated log skidders, where steering is accomplished by the use of steering cylinders connected to the two sections of the vehicle, openings are provided through which the cylinders extend further complicating the placement of the steps.

The cylinder openings typically expose the vehicle brakes lines, fuel lines, hydraulic lines and other components to damage from logs and tree limbs which are ever present in the logging environment. The possibility of damage from limbs and logs is great and the various fluid lines must be inspected, typically as part of a daily or weekly inspection. The fluid lines can be inspected visually by looking through the cylinder openings, but to prevent the entrance of limbs or logs, the openings must be covered in some manner without interfering with the normal operation of the vehicle. Thus, the problem is to provide ease of inspection but with maximum protection from limbs and logs while providing a step for access to the vehicle.

One solution to the problem is provided by U.S. Pat. No. 4,121,691 which issued to Eugene M. Poplawski on Oct. 24, 1978 in which a composite inspection plate-step is disclosed. The inspection plate is connected to the vehicle covering the cylinder openings and protecting the fluid lines from logs and limbs but is removable for inspection of the fluid lines. The step provides easy access to the vehicle for operation. However, the composite inspection plate-step must be removed in order to inspect the fluid lines which is time consuming and requires tools for removing and later replacing the bolts. Also, because of its size and weight, two people may be required to remove and replace it.

Also, in a logging environment, the vehicle and the operator are subject to much abuse. For example, mud may be several inches deep on the terrain where portions of the logging operation are performed. Under this condition, the step must also facilitate removal of mud from the operator's shoes. While, Poplawski provides holes through which excess mud from the operator's shoes may pass, under extreme conditions their efficiency is limited. Since a muddy step can be extremely slippery, it is necessary that mud be removed for improved operator safety.

It is therefore desirable to provide a step for easy access which also facilitates removal of mud from shoes and which facilitates easy visual inspection of fluid lines while protecting the fluid lines from logs and limbs in typical logging environments.

SUMMARY AND OBJECTS OF THE INVENTION

It is an object of the invention to shield fluid lines and other vulnerable vehicle components exposed to damage through the steering cylinder opening. A feature of this invention is that the above object is accomplished by covering the steering cylinder opening with a first member. It is an advantage of this feature that the entry of logs and limbs, which are abundant in logging environments, is prevented thereby prolonging the useful life of the vehicle.

It is an object of this invention to provide a step for access to the log skidder which will not become covered with slipper mud posing a safety hazard to the operator and soiling the operator's compartment, especially foot controls. A feature of this invention is a step formed on the first member constructed so that it aids the removal of mud from shoes while minimizing mud build-up on the step itself. This step provides the advantage of being effective yet simple to construct.

It is an object of this invention to provide an inspection port through which vulnerable vehicle components, particularly fluid lines, may be inspected. An inspection port formed in the first member is a feature of this invention. The inspection port is vertically offset from the steering cylinder opening to inhibit entry of logs and limbs, but the fluid lines may be inspected through the inspection port and cylinder opening. The inspection port provides the advantage of being so easy to use that fluid lines can be inspected daily without the need for any tools. The inspection port saves a considerable amount of time and only one person is needed to perform the inspection.

In one aspect of the present invention, a composite shield-step for an articulated vehicle of the type having a steering cylinder opening through which vulnerable vehicle components are exposed comprises a first member having an opening and being connected to the vehicle and positioned about the steering cylinder opening with the first member opening offset from the cylinder opening with the vulnerable vehicle components being visible through the openings. A first step is formed on the first member.

BRIEF DESCRIPTION OF THE DRAWINGS

FIG. 1 is a diagrammatic side view of a log handling work vehicle incorporating a composite shield-step having an inspection port;

FIG. 2 is a diagrammatic top view taken along line II—II of FIG. 1; and

FIG. 3 is a diagrammatic side view taken along line III—III of FIG. 2.

DETAILED DESCRIPTION OF THE INVENTION

Referring to FIG. 1, a work vehicle, such as an articulated log skidder, has a frame 11 with an opening 20 therein through which a steering cylinder 22 extends. The ends of the steering cylinder are connected to first and second pivotally connected vehicle portions for moving the vehicle portions towards and from each other.

The opening 20 is large enough to allow free movement of the cylinder 22 in the opening during pivotal movement of the first and second vehicle portions. For this purpose the opening 20 has an area several times larger than the cross-sectional area of the cylinder 22.

The opening 20 preferably has an oblong configuration with its height being generally vertical and its length being generally horizontal so that as the log skidder is articulated, the cylinder 22 moves relative to the opening 20 horizontally along the length of the opening 20. The ends of the opening 20 are preferably semicircular to facilitate maximum articulation of the skidder and to reduce stresses encountered at sharp corners.

Referring to FIGS. 2 and 3, the cylinder 22 is preferably a hydraulic cylinder which receives pressurized fluid through one of the fluid lines 13. The fluid lines 13 typically carry fluid toward and from cylinder 22 as well as supply fuel and communicate fluid pressure for braking the vehicle. The fluid lines 13 are normally at a higher elevation than the components they serve to help protect them from damage caused by debris entering from under the vehicle.

Referring to FIGS. 1–3, a composite shield-step 10 is provided for the log skidder for protecting the fluid lines 13 from damage from logs and limbs in the typical logging environment and simultaneously providing a convenient inspection port for inspecting the fluid lines 13 on a daily basis.

The shield-step 10 comprises a first member 12 which has a port or opening 15. The first member 12 is preferably formed of strong impact resistant material, such as metal, fiberglass reinforced resin or the like, and is positioned about the cylinder opening 20 and connected to the frame 11 by bolts 18 so that it is removable for vehicle servicing. The first member 12 has a general "U" configuration when viewed from the top (FIG. 2) with the legs 17 of the "U" being connected by a sidewall 19 which has the port or opening 15 therein. The sidewall 19 is spaced from the frame 11 so that it truly forms a shaped cover.

The opening 15 is preferably vertically offset from the cylinder opening 20 so that the fluid lines 13 are visible when observed through both openings 15 and 20, but their alignment is such that logs and limbs cannot readily extend themselves through both openings. It is readily seen that any horizontal offset would be of doubtful value since logs and limbs will normally be carried or propelled horizontally by brushing engagement with the skidder during its movement through the forest. Thus, the sidewall opening 15 is at a different elevation than the cylinder opening 20. Preferably, the sidewall opening 15 is lower than the cylinder opening 20 to facilitate easy viewing of the fluid lines 13 which are normally at a higher elevation than the cylinder opening 20.

Referring to FIG. 2, the first member 12 partially covers the cylinder opening 20 instead of completely covering the opening 20. A selected portion 21 of the opening 20 remains open providing a visual pephole 21 for inspecting the fluid lines 13. The peephole 21 is small in size and does not provide an entrance foyer for logs and limbs. It may be desirable under muddy conditions or on cloudy days to perform the visual inspection with the aid of a flashlight whose light beam is focused through openings 15 and 20 while an operator observes the fluid lines 13 through the peephole 21.

By this construction a protective cover 12 is formed which protects the fluid lines 13 and other vulnerable vehicle components from damage caused by logs and limbs in the logging environment. At the same time, an inspection port 15 is provided to facilitate visual inspection of the fluid lines 13 without removing the protective cover 12 thereby saving time and allowing the inspection to be performed on a daily basis, or more often if desired.

The composite shield-step 10 includes a first step 23 formed on the first member 12. The first step 23 exists at the junction of the first member 12 and lowermost portion of the sidewall opening 15. Actually, the opening 15 is formed with a straight bottom portion wide enough to receive an operators shoed foot. By being substantially a straight, narrow, rigid ledge, the step 23 provides support and removes mud from the operator's shoes. Dislodged mud is gravitationally urged toward the vehicle and back to earth.

A protective shield 24 is connected to the sidewall 19 of the first member 12 and is positioned inside the first member 12 between the sidewall 19 and the vehicle frame 11. The shield 24 has a downwardly extending portion which extends to a lower elevation than the topmost portion of the opening 15. By this construction, the operator's foot, when placed on the first step 23 is shielded from the cylinder opening 20 and the cylinder 22 since, in the preferred arrangement, the top of opening 15 is lower than the top of opening 20 and the foot shield 24 extends downwardly far enough to provide this foot protection.

Referring to FIGS. 2 and 3, a second step 14 is also formed on the first member 12 at a higher elevation than the first step 23. The second step 14 is formed by at least one rigid elongate member 25 extending between the legs 17 of the "U" and is positioned atop or at the top of the first member 12. The second step 14 may contain a plurality of elongate members 25 connected to the legs 17 by suitable means, such as welding, for example. Similarly these elongate members 25 may be used in the first step 23 for extra foot support although they are not required for an effective step. The second step 14 may comprise a grate, which is essentially a plurality of connected elongate members or bars 25, fixed at the first member 12. The members 25 are spaced so that mud is dislodged from shoes and expelled through spaces 26 existing between the elongate members 25. The top surfaces of the elongate members 25 are preferably roughened for anti-skid purposes. Similar anti-skid treatment may be used for the first step 23.

By this construction a step 14 is provided which stays reasonably free of mud and provides a nonskid surface for the operator.

In operation, the operator simply looks through the inspection port 15 to view the fluid lines or through the peephole 21, using a flashlight as necessary. He then uses the first step 23 to remove mud from his shoes and to make his way to the second step 14. The second step 14 generally provides access to the operator's compartment while removing remaining mud from the operator's shoes. Since dislodged mud falls through the openings 26 to earth, the second step 14 remains free of mud thereby providing a clean, non-skid step surface for dismounting.

Other objects, aspects and advantages of this invention will become apparent from a study of the disclosure, drawings and appended claims.

I claim:

1. A composite shield-step (10) in combination with an articulated vehicle of the type having a frame (11) with a steering cylinder opening (20) through which vulnerable vehicle components (13) are exposed to damage in the work environment of the vehicle, said shield-step (10) comprising:

a first member (12) having an opening (15) therein with a lower side and positioned about the steering cylinder opening (20) with the first member opening (15) vertically offset from the steering cylinder opening with said vulnerable vehicle components being visible through the openings (20,15) wherein the first member (12) has a general "U" configuration, said first member (12) being mounted externally on said frame (11);

a first step (23) formed on the first member (12), said first step (23) constituting an edge of said first member (12) which bounds the lower side of said first member's opening (15); and a second step (14) formed by at least one rigid elongate member (25) extending between the legs of the "U" and positioned at the top of the first member (12).

2. The combination as set forth in claim 1, wherein the first member opening (15) is positioned at a lower elevation than the steering cylinder opening (20).

3. The combination as set forth in claim 1, wherein the first member (12) partially covers the steering cylinder opening (20) leaving a selected portion (21) of said opening (20) unshielded, said selected portion (21) being of a size sufficient for visually inspecting said vulnerable vehicle components (13) through said selected portion (21) without substantially increasing the exposure of said vulnerable vehicle components (13) to environmental work hazards.

4. The combination as set forth in claim 1, wherein the first member (12) partially covers the steering cylinder opening (20) leaving a selected portion (21) of said opening (20) unshielded, said selected portion (21) forming peephole (21) for visually inspecting and vulnerable vehicle components (13) through said selected portion (21) with the aid of light beam through the first member opening (15).

5. The combination as set forth in claim 1, including:
a second step (14) formed on the first member (12) and being at a higher elevation than said first step (23).

6. The combination as set forth in claim 1, including:
a second step (14) formed by a grate positioned atop the first member (12).

7. The combination as set forth in claim 1, including:
a protective shield (24) connected to the first member (12) and positioned inside the first member (12) between the outermost wall of the first member (12) and the vehicle frame (11), said shield having a downwardly extending portion which extends to a lower elevation than the topmost portion of the first member opening (15) and is separated from said step (23), said shield (24) preventing an operator's foot from entering the steering cylinder opening (20) through the first member opening (15) in the installed position of the shield (24).

* * * * *